United States Patent
Sandberg-Diment

(10) Patent No.: US 9,947,009 B1
(45) Date of Patent: Apr. 17, 2018

(54) METHOD AND SYSTEM FOR GRAPHIC AND SONIC ENCRYPTION FOR SECURING DATA AND ELECTRONIC DEVICES

(71) Applicant: Erik Sandberg-Diment, Putnam, CT (US)

(72) Inventor: Erik Sandberg-Diment, Putnam, CT (US)

(73) Assignee: Erik Sandberg-Diment, Putnam, CT (US)

( * ) Notice: Subject to any disclaimer, the term of this patent is extended or adjusted under 35 U.S.C. 154(b) by 0 days.

(21) Appl. No.: 14/330,469

(22) Filed: Jul. 14, 2014

Related U.S. Application Data

(60) Provisional application No. 61/862,718, filed on Aug. 6, 2013.

(51) Int. Cl.
*G06Q 20/00* (2012.01)
*G06Q 20/38* (2012.01)
*G06Q 20/32* (2012.01)

(52) U.S. Cl.
CPC ..... *G06Q 20/3829* (2013.01); *G06Q 20/3272* (2013.01); *G06Q 20/3274* (2013.01)

(58) Field of Classification Search
None
See application file for complete search history.

(56) References Cited

U.S. PATENT DOCUMENTS

| | | | | |
|---|---|---|---|---|
| 5,604,801 A | * | 2/1997 | Dolan | H04L 9/0822 380/277 |
| 6,757,826 B1 | * | 6/2004 | Paltenghe | G06F 21/64 713/170 |
| 2003/0103653 A1 | * | 6/2003 | Avni | G06F 21/32 382/119 |
| 2010/0050242 A1 | * | 2/2010 | Delia | H04L 63/083 726/6 |
| 2011/0113487 A1 | * | 5/2011 | Miller | G06F 21/36 726/19 |

\* cited by examiner

*Primary Examiner* — John W Hayes
*Assistant Examiner* — John M Winter
(74) *Attorney, Agent, or Firm* — DeLio, Peterson & Curcio LLC; David R. Pegnataro

(57) ABSTRACT

A method of verifying a transaction between a first party and a second party using a first graphical symbol having at least a two-dimensional array of different segments arranged in a visually distinct pattern, or a first sonic symbol having different frequency magnitude segments over a desired time period. A second graphical or sonic symbol has only a portion of the segments of the first symbol. The first and second symbols are accessible by the first and second parties, respectively. The second symbol is compared to the first symbol and, if all of the segments of the second symbol match segments of the first symbol, the transaction between the first party and the second party is verified.

7 Claims, 7 Drawing Sheets

METHOD AND SYSTEM FOR GRAPHIC AND SONIC ENCRYPTION FOR SECURING DATA AND ELECTRONIC DEVICES

BACKGROUND OF THE INVENTION

1. Field of the Invention

The present invention relates to a method and system for encrypting data and electronic devices for security.

2. Description of Related Art

Encryption methods for securing data, including financial transactions, electronic devices and the cloud continues to be of great concern. Customers' account numbers, passwords and other identifying information in alphanumeric characters are subject to hacking and other theft, even from highly secure sites maintained by vendors and other information storage professionals.

SUMMARY OF THE INVENTION

Bearing in mind the problems and deficiencies of the prior art, it is therefore an object of the present invention to provide an improved method and system for encrypting data and electronic devices for security.

It is another object of the present invention to provide such an encryption method and system that is not dependent on the use of alphanumeric characters.

A further object of the invention is to provide such a method and system in which the customer or other user may customize and readily change the password, token or key used for the encryption.

Yet another object of the invention is to provide such a method and system which employs visual, graphical, holographical or sonic representation in place of the traditional alphanumeric keys used in encryption.

Still other objects and advantages of the invention will in part be obvious and will in part be apparent from the specification.

The above and other objects, which will be apparent to those skilled in the art, are achieved in the present invention which is directed to a method of verifying a transaction between a first party and a second party comprising providing a first graphical symbol having at least a two-dimensional array of different segments arranged in a visually distinct pattern, the first graphical symbol being accessible by the first party. The method includes creating a second graphical symbol having only a portion of the segments in the array of the first graphical symbol, the second graphical symbol being accessible by the second party and comparing the second graphical symbol to the first graphical symbol. The method includes determining if all of the segments of the second graphical symbol match segments of the first graphical symbol and if all of the segments of the second graphical symbol match segments of the first graphical symbol, verifying the transaction between the first party and the second party.

The second party may transmit the second graphical symbol to the first party, and the first party may compare the second graphical symbol to the first graphical symbol and determine if all of the segments of the second graphical symbol match segments of the first graphical symbol. The method may further include deleting the second graphical symbol at the first party after verifying the transaction between the first party and the second party. The graphical symbol segments may be pixels of a picture. The first graphical symbol may be also accessible by the second party. The second party may create the first graphical symbol and transmits it to the first party. The second party may create the second graphical symbol and transmits it to the first party. The second party may transmit the first graphical symbol to the first party before transmitting the second graphical symbol to the first party. The second graphical symbol may be compared to the first graphical symbol by the first party and the first party may determine if all of the segments of the second graphical symbol match segments of the first graphical symbol. The first graphical symbol may be stored in media at the first party and the second graphical symbol may be stored in media at the second party, and the respective media of the first and second graphical symbols may be physically separated from each other. The array of different segments in the first graphical symbol may form a picture, and the array of different segments in the second graphical symbol may be a portion of the picture of the first graphical symbol. The array of different segments in the second graphical symbol may be a continuous portion of the picture of the first graphical symbol. The array of different segments in the second graphical symbol may be a discontinuous portion of the picture of the first graphical symbol.

The method may further include creating a third graphical symbol having only a portion of the segments in the array of the first graphical symbol, the third graphical symbol being different from the second graphical symbol and being accessible by the second party, comparing the third graphical symbol to the first graphical symbol, determining if all of the segments of the third graphical symbol match segments of the first graphical symbol and if all of the segments of the third graphical symbol match segments of the first graphical symbol, verifying a further transaction between the first party and the second party. The first and second graphical symbols may have a two-dimensional array of different segments. The first and second graphical symbols may have a three-dimensional array of different segments. The first graphical symbol may have a three-dimensional array of different segments and the second graphical symbol may have a two-dimensional array of different segments. The first graphical symbol may include alphanumeric characters in the visually distinct pattern. The first party may be a merchant and the second party may be a consumer, and the verification may be of a financial transaction.

The first party may be a merchant and the second party may be a consumer, wherein the first graphical symbol may identify a financial account of the consumer, and the verification may be of a financial transaction. The verification may be of use of a credit card by the consumer in a financial transaction.

The first party may be a device and the second party may be a controller for the device, and the verification may be of operation of the device. The method may further include physically connecting the controller to the device and transmitting the second graphical symbol from the controller to the device before comparing the second graphical symbol to the first graphical symbol. The method may further include deactivating at least a portion of the device if the controller is no longer physically connected to the device. The method may further include physically locating the controller near the device and transmitting the second graphical symbol from the controller to the device by wireless radio frequency transmission before comparing the second graphical symbol to the first graphical symbol. The method may further include deactivating at least a portion of the device if the controller is no longer physically within a predetermined distance of the device. The device may be an electronic device. The controller may be carried by an authorized user of the device. The controller may transmit the second graphical symbol to the device via the Internet.

Another aspect of the present invention is directed to a method of verifying a transaction between a first party and a second party comprising providing a first graphical symbol having at least a two-dimensional array of different segments arranged in a visually distinct pattern, the first graphical symbol having a border. The method includes providing a second graphical symbol having at least a two-dimensional array of different segments arranged in a visually distinct pattern, the second graphical symbol having a border complementing the first graphical symbol border, the first and second graphical symbols when laid adjacent each other along the complementing border forming a larger visually distinct pattern. The method includes making the first graphical symbol accessible to the first party, making the second graphical symbol accessible to the second party and comparing the second graphical symbol to the first graphical symbol. The method includes determining if the border of the second graphical symbol complements the border of the first graphical symbol and if the border of the second graphical symbol complements the border of the first graphical symbol, verifying the transaction between the first party and the second party. The first and second graphical symbols may have a three-dimensional array of different segments, and may be holographic images.

In a further aspect, the present invention is directed to a system for verifying a transaction involving a device comprising a device having stored in a memory a first graphical symbol having at least a two-dimensional array of different segments arranged in a visually distinct pattern, and a controller for the device having stored in a memory a second graphical symbol having only a portion of the segments in the array of the first graphical symbol. The controller for the device is adapted to compare the second graphical symbol to the first graphical symbol, determine if all of the segments of the second graphical symbol match segments of the first graphical symbol, and, if all of the segments of the second graphical symbol match segments of the first graphical symbol, verify the transaction involving the device.

In yet another aspect, the present invention is directed to a system for verifying a transaction involving a device comprising a device having stored in a memory a first graphical symbol having at least a two-dimensional array of different segments arranged in a visually distinct pattern, the first graphical symbol having a border, and a controller for the device having stored in a memory a second graphical symbol having at least a two-dimensional array of different segments arranged in a visually distinct pattern. The second graphical symbol has a border complementing the first graphical symbol border, the first and second graphical symbols when laid adjacent each other along the complementing border forming a larger visually distinct pattern. The controller for the device is adapted to compare the second graphical symbol to the first graphical symbol, determine if the border of the second graphical symbol complements the border of the first graphical symbol, and, if the border of the second graphical symbol complements the border of the first graphical symbol, verify the transaction involving the device.

The present invention is directed in a further aspect to a method of verifying a transaction between a first party and a second party comprising providing a first sonic symbol having different frequency magnitude segments over a desired time period, the first sonic symbol being accessible by the first party, and creating a second sonic symbol having only a portion of the frequency magnitude segments or time period in the first sonic symbol, the second graphical symbol being accessible by the second party. The method includes comparing the second sonic symbol to the first graphical symbol, and determining if all of the frequency magnitude segments or time period of the second sonic symbol match frequency magnitude segments or time period of the first sonic symbol. If all of the segments of the second sonic symbol match segments or time period of the first sonic symbol, the method includes verifying the transaction between the first party and the second party.

Another aspect to which the present invention is directed is a method of verifying a transaction between a first party and a second party comprising providing a first sonic symbol having frequency magnitude segments over a desired time period, and providing a second sonic symbol having frequency magnitude segments over a desired time period that are different from and complementing the first sonic symbol. The first and second sonic symbols, when combined, form a larger, complete sonic symbol. The method includes making the first sonic symbol accessible to the first party, making the second sonic symbol accessible to the second party, comparing the second sonic symbol to the first sonic symbol, and determining if the second sonic symbol complements the first sonic symbol. If the second sonic symbol complements the first sonic symbol, the method includes verifying the transaction between the first party and the second party.

A further aspect of the present invention is a system for verifying a transaction involving a device comprising a device having stored in a memory a first sonic symbol having different frequency magnitude segments over a desired time period and a controller for the device having stored in a memory a second sonic symbol having only a portion of the frequency magnitude segments or time period in the first sonic symbol. The controller for the device is adapted to compare the second sonic symbol to the first graphical symbol, determine if all of the frequency magnitude segments or time period of the second sonic symbol match frequency magnitude segments or time period of the first sonic symbol, and, if all of the segments of the second sonic symbol match segments or time period of the first sonic symbol, verify the transaction involving the device.

Another aspect of the present invention is a system for verifying a transaction involving a device comprising a device having stored in a memory a first sonic symbol having frequency magnitude segments over a desired time period and a controller for the device having stored in a memory a second sonic symbol having frequency magnitude segments over a desired time period that are different from and complementing the first sonic symbol. The first and second sonic symbols when combined forming a larger, complete sonic symbol. The controller for the device is adapted to compare the second sonic symbol to the first sonic symbol, determine if the second sonic symbol complements the first sonic symbol, and, if the second sonic symbol complements the first sonic symbol, verify the transaction involving the device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-9 of the drawings in which like numerals refer to like features of the invention.

The present invention provides an encryption method and system that substitutes a visual, graphical, holographical or sonic representation for the traditional alphanumeric keys used in encryption. This is not only more secure than an alphanumeric key, because each picture or sequence of sounds is unique to the individual generating it but such a graphic key or sonic key is also much easier for a user to generate. Since no encryption, in the ordinary sense, is involved there can be no "decryption." There is no way to determine what is involved visually, or sonically, in the second token, from analyzing the first token.

The present invention may be directed to a graphical or sonic key application in public-key cryptography. In public key encryption an interlocking pair of keys is used; the public key which can be freely distributed, and a private key that is kept secret. The system and method of the invention employ graphics, or sonic graphs, i.e., the visual display of the keys, rather than the current alphanumeric basis of the keys used in such public-keys.

In this case the public key is a "frame" into which the private key, the picture, or sound token, is inserted. In the case of graphics, the frame, which quite literally may frame or surround the picture, can be of any design or pattern, including a visual alpha-numeric display. The key, and uniqueness, is that the frame is graphic.

A picture or other graphical symbol or sonic token may be used as a whole, being matched by the sender and the receiver for validation. Unless otherwise noted, the term graphical symbol includes pictures, videos or other visual symbols, and examples of pictures herein are applicable to graphical symbols in general. The graphical symbol is used as the token or key in the method and system of the present invention. For a truly personal graphical token, for instance when using a cell phone, the camera feature of the phone may be used to take a picture, of say the owner's pet dog or of the owner himself.

Figure 1:
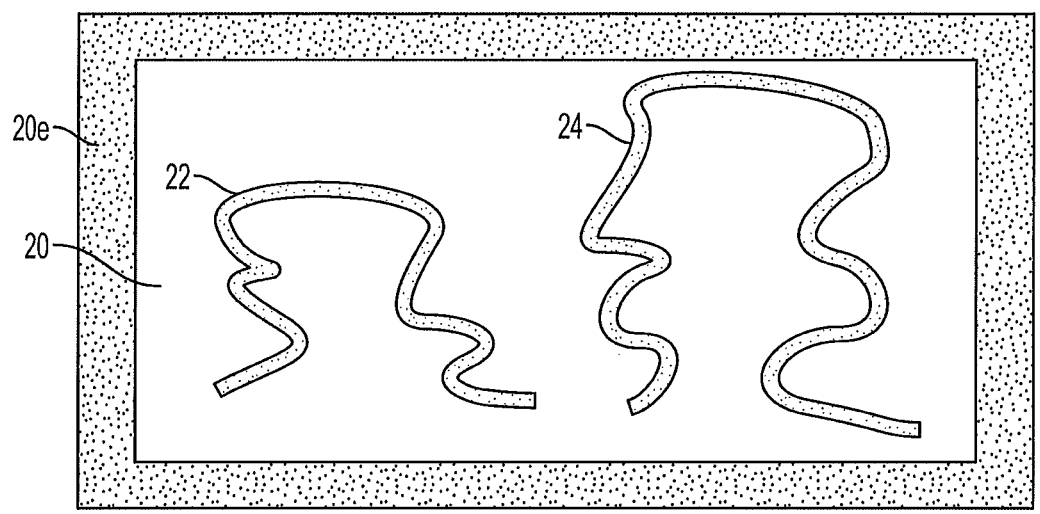
FIG. 1 is a view of an example of graphical symbol used for encryption in accordance with the present invention.

An example of a public key frame into which a private key picture is inserted is shown in FIG. 1, where a complete picture 20 includes images 22, 24 on a background. Each image of the picture is a two-dimensional array of different pixels or other segments arranged in a visually distinct pattern. Frame portion 20e creates a surrounding border of picture 20. The frame may be a simple plain black and white or colored border. At its most extreme, perhaps, the frame could be a visualization of an ornate, carved, gilded Baroque representation. The private key picture is a token inserted into the public key visual "frame" token to complete the key. As shown in FIG. 1, border 20e is said to complement picture 20 containing images 22, 24, and vice versa, i.e., the picture and border have common edges substantially contacting each other.

The public key is treated as an address to which information or value may be sent. It is akin to an account number. As an example, in a financial transaction, the paying party signs over a value in one of these addresses, or frames, by using his or her private key, the graphical symbol or picture, to perform an operation, called "signing," on the contents of the transfer, which includes the recipients address. Anyone can use the sender's public key to verify that the sender's private key actually signed the transaction.

Figure 2:
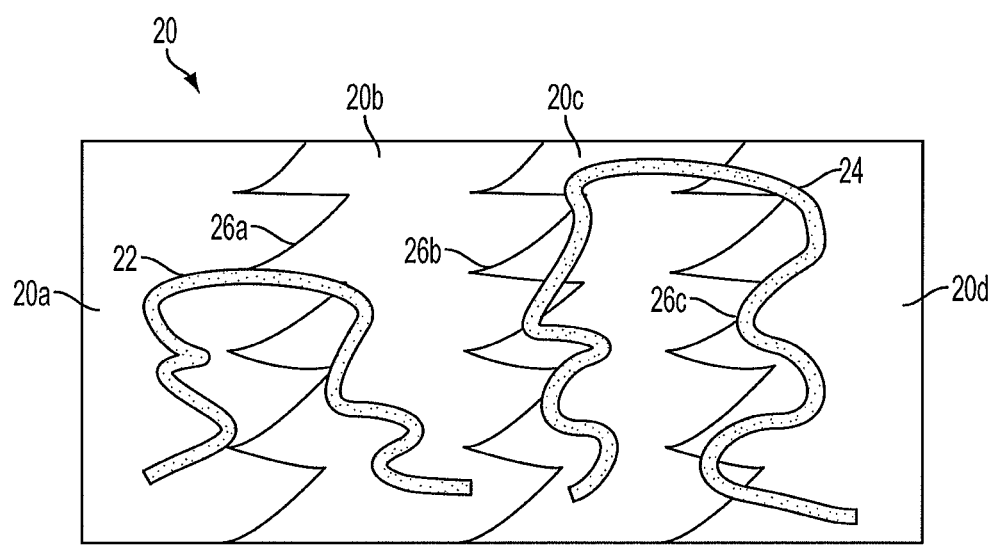
FIG. 2 is a modification of the graphical symbol of FIG. 1, segmented into multiple portions.

The split between public and private keys or tokens may also be generated using the aforementioned division of the graphic or picture into two or more parts or tokens. The picture may be electronically "torn" in two or more pieces via one or more jagged lines, such as would occur if one were to physically tear a picture in half, then possibly torn in half again, and so on, into multiple tokens. For example, as an alternative to employing an entire picture as a single private key, the picture may be separated into the two or more tokens as shown in FIG. 2, where picture 20 is separated by three linear or non-linear internal borders 26a, 26b, 26c into four different portions, 20a, 20b, 20c, 20d. The images 22, 24 may each split and be partially present on different ones of portions 20a, 20b, 20c, 20d. In FIG. 2, image 22 is partially present on picture portions 20a and 20b, and image 24 is partially present on picture portions 20b, 20c and 20d. Any one of picture portions 20a, 20b, 20c, 20d may be said to complement an adjacent portion, wherein each has a common edge substantially contacting an adjacent portion along lines 26a, 26b or 26c. Each one of picture portions 20a, 20b, 20c, 20d may be said to match the completed picture 20, wherein each has segments that, when overlaid on picture 20, are in substantially the same position and configuration as a segment of picture 20. However, only a portion of the segments in any one of picture 20 match segments in any one of picture portions 20a, 20b, 20c, 20d. In order to determine a match, a predetermined number of pixels or segment registration points must be identical and in identical position when the picture portions are overlaid onto the picture. The segmented picture 20 of FIG. 2 may be used by itself, or may be employed with the frame 20*e* of FIG. 1 to create a multi-token public/private key encryption.

Figure 3:
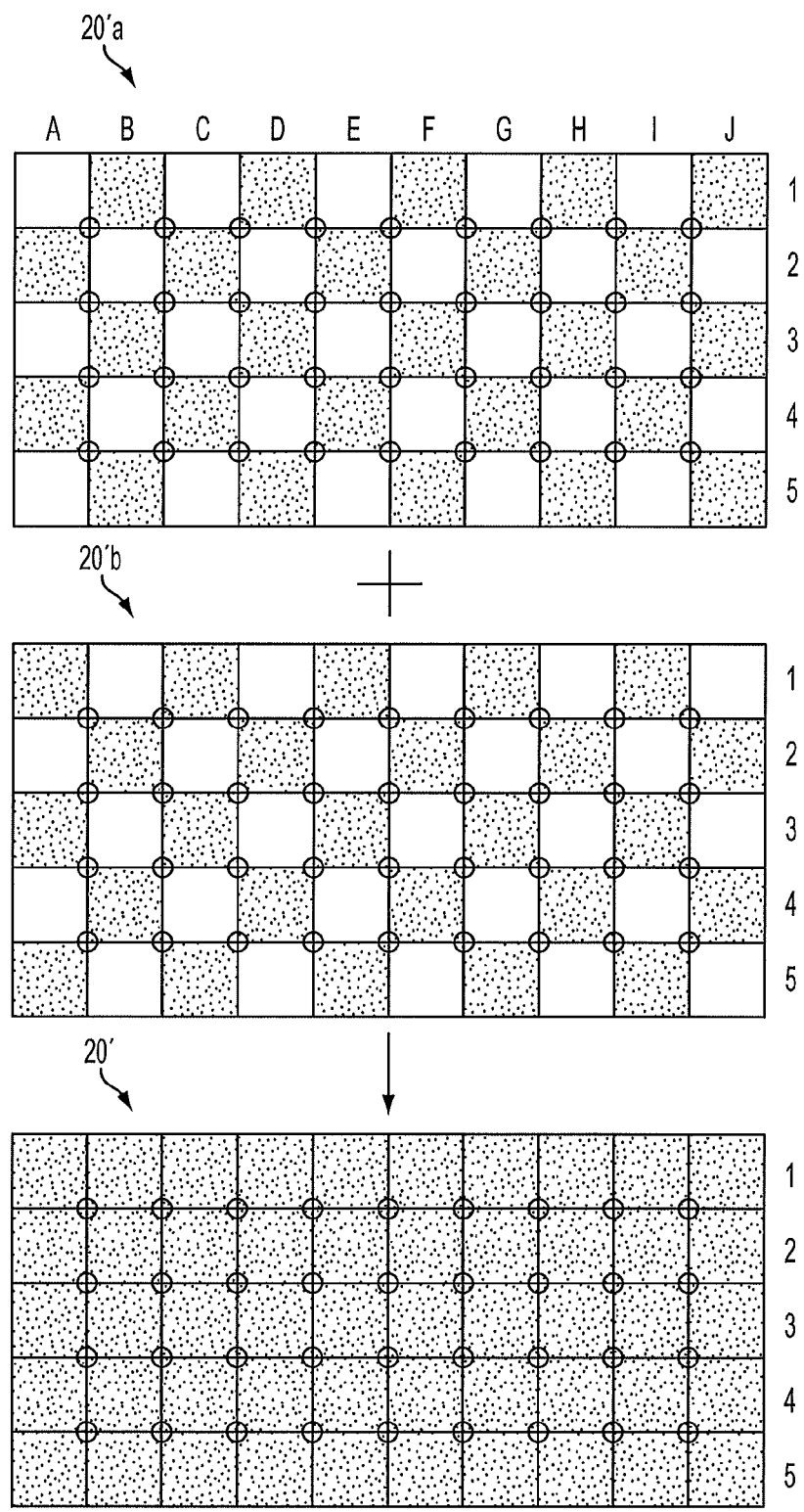
FIG. 3 is a another example of the graphical symbol used for encryption showing two complementary portions that may be overlaid and combined to create the complete graphical symbol.

The picture itself, with or without using a frame, can be broken into two or more tokens in several ways. One would be by alternating pixels. As an example starting, for instance, in the upper left corner of the image, the first pixel goes into token one, the second pixel into token two, the third pixel into token one and so forth. This is shown in FIG. 3, where picture 20' is broken into a two dimensional array of pixels or segments arranged in columns A through J and rows 1 through 5. Each pixel can be the same or different color to create the desired two dimensional image. Picture 20' is broken into two picture portions or tokens 20'*a* and 20'*b*, with pixel A-1 in token 20'*b*, pixel A-2 in token 20'*a*, and so on, with each alternating pixel in a different token. When tokens 20'*a* and 20'*b* are overlaid on each other, the result is the completed picture 20'. Either one of tokens 20'*a* and 20'*b* complement each other, i.e., they have common edges substantially contacting each other. Each of the tokens 20'*a* and 20'*b* match the completed picture 20', i.e., every pixel on tokens 20'*a* and 20'*b* is in substantially the same position and configuration as a pixel of picture 20'. Only a portion of the pixels of picture 20' match the pixels on tokens 20'*a* and 20'*b*.

Figure 4:
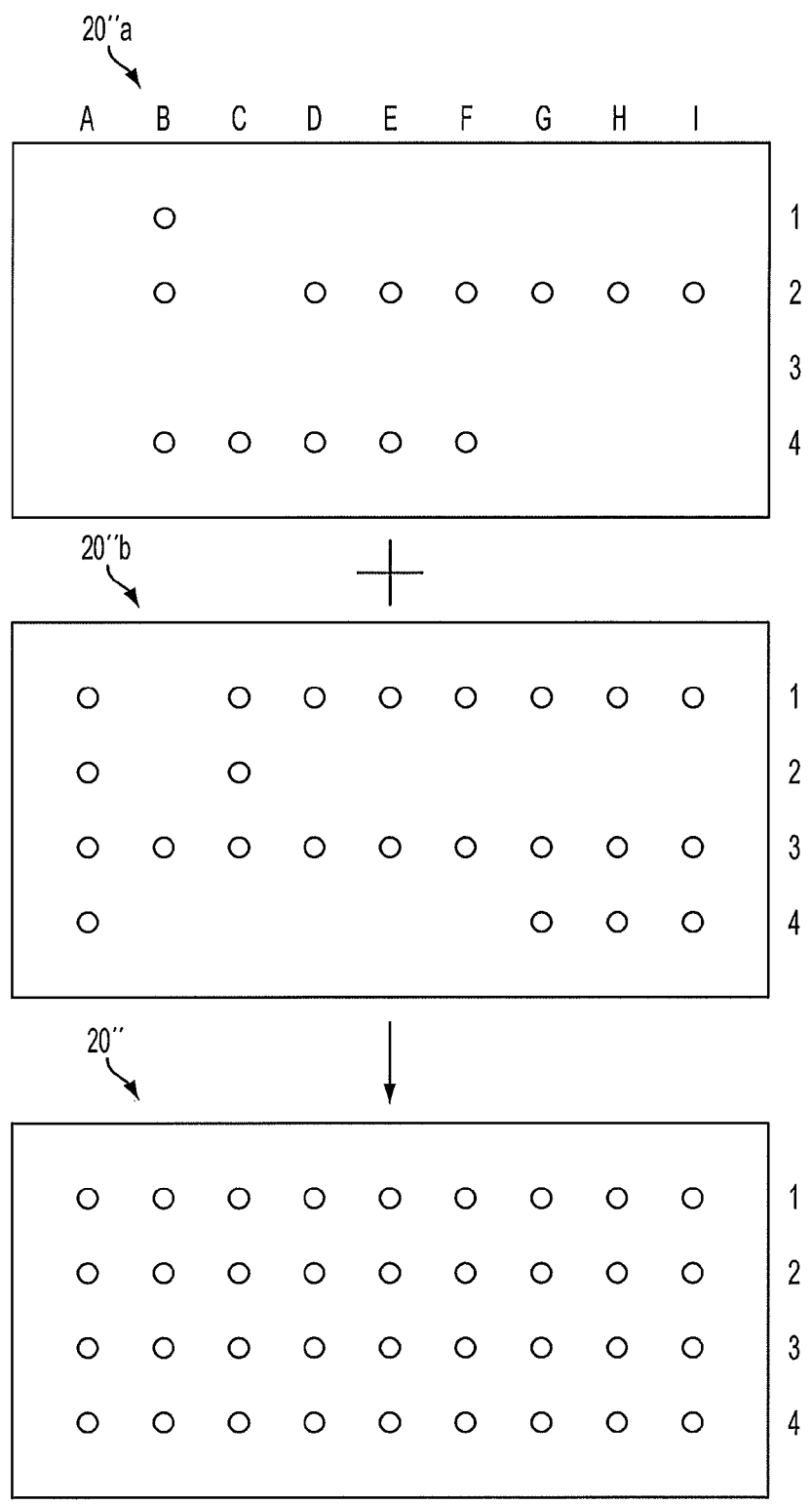
FIG. 4 is a further example of the graphical symbol used for encryption showing two complementary portions that may be overlaid and combined to create the complete graphical symbol.

Another way of splitting the picture would be to do it pixel by pixel, either one at a time, or in groups. For instance the partial picture would match the 1st pixel with the whole picture, than the 3rd pixel, the 5th pixel and so forth. Or the partial picture could match the first three pixels with the whole picture, then skip three pixels, and match pixels 7, 8, 9 and so on. An example is shown in FIG. 4, where picture 20" is a two dimensional array of pixels or segments arranged in columns A through I and rows 1 through 4. Again, each pixel can be the same or different color to create the desired two dimensional image. Main picture 20" is broken into two picture portions or tokens 20"*a* and 20"*b*. In column A, token 20"*a* has no pixels while token 20"*b* has pixels in locations A-1 through A-4. In column B, token 20"*a* has pixels in positions A-1, A-2 and A-4, while token 20"*b* has a pixel in location A-3. The remaining pixels of picture 20" are present on one or the other of tokens 20"*a*, 20"*b* as shown. When tokens 20"*a* and 20"*b* are overlaid on each other, the result is the completed picture 20". Either one of tokens 20'*a* and 20'*b* match the completed picture 20', and tokens 20"*a* and 20"*b* complement each other.

Figure 5:
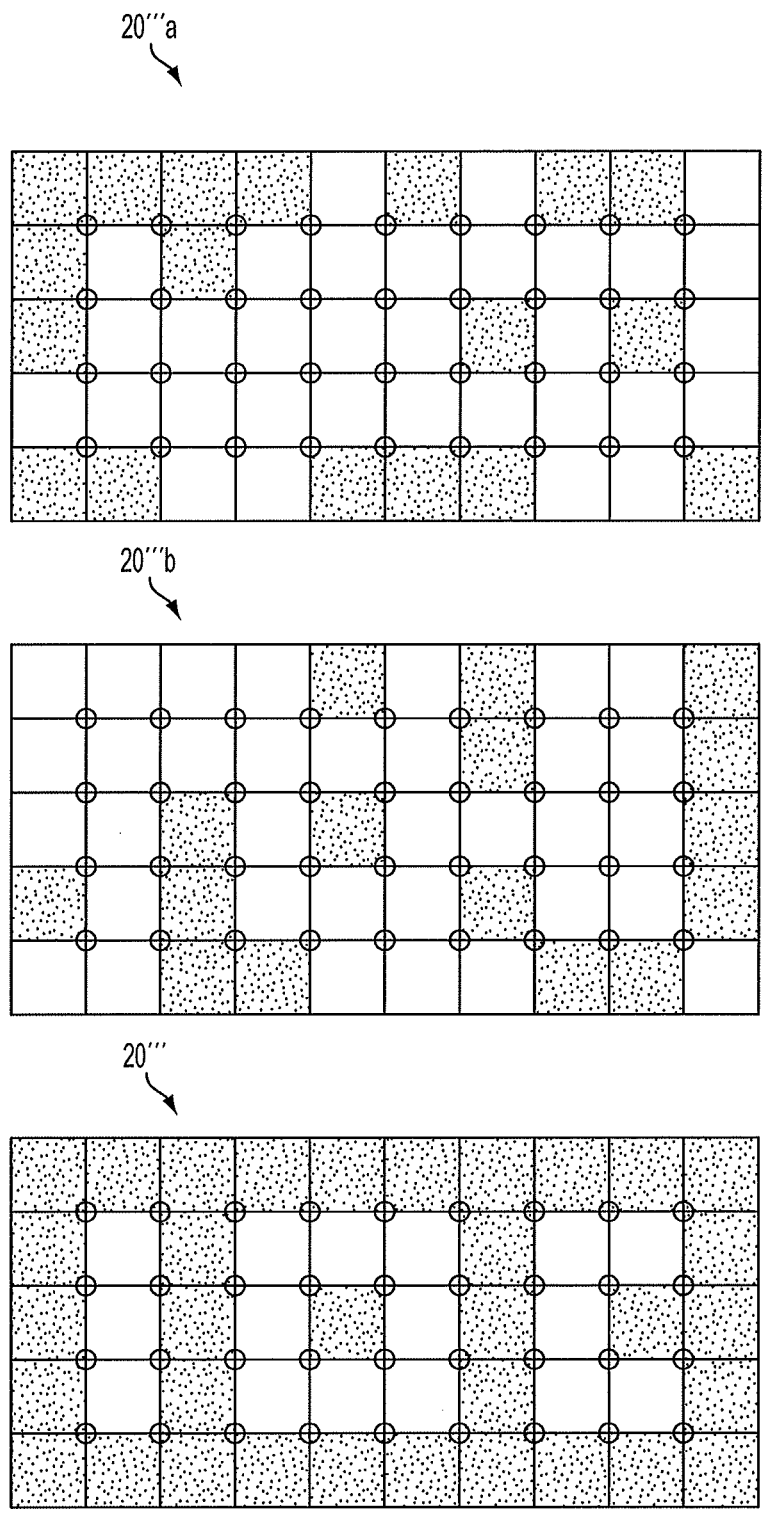
FIG. 5 is an alternate example of the graphical symbol used for encryption showing two complementary portions that may be overlaid and combined to create the complete graphical symbol having alphanumeric characters as a graphic.

In another example the picture portions or tokens might individually contain different segments that can be combined to create larger images of alphanumeric characters that form a credit card number, passcode or other information. This is shown in FIG. 5, where when the pixels of token 20'''*a* are overlaid with the differently arrayed pixels of token 20'''*b*, the result is picture 20''', which itself forms the alphanumeric characters "IOC" or "IOC." Either one of tokens 20'''*a* and 20'''*b* match the completed picture 20'''. Tokens 20'''*a* and 20'''*b* also complement each other, because they do substantially share boundaries around their pixels or segments, including those boundaries that form part of the desired alphanumeric characters.

Another way of separating the image into two or more keys would be to use, instead of a two dimensional image, a holographic or other three dimensional image. In this case the picture could be broken by splitting the holographic image by layers or into the reference beam and the illumination beam, or other partial components, into separate tokens. In such case, the graphical symbols would be three dimensional arrays in which one or more portions of the graphical symbol would be matched against the complete graphical symbol.

Figure 6:
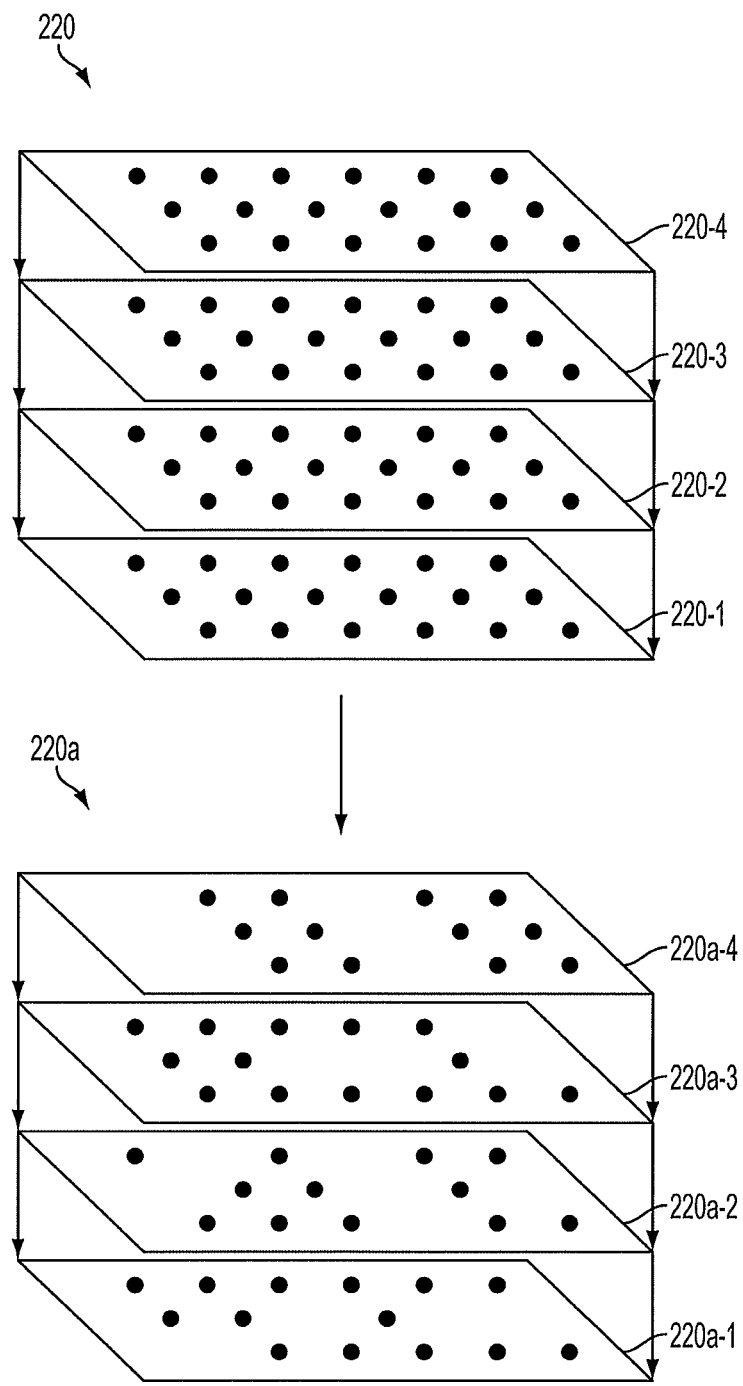
FIG. 6 is another alternate example of the graphical symbol used for encryption showing a complete three dimensional graphical symbol and a matching three dimensional graphical symbol having only a portion of the pixels or segments of the complete symbol.

In the example of a three dimensional token or key shown in FIG. 6, the entire three dimensional hologram or image 220 comprises parallel layers 220-1, 220-2, 220-3 and 220-4, each with individual pixels or segments in a two dimensional matrix. Graphical symbol 220 may be broken into two or more tokens as described above, and one of these partial graphical symbols is shown as 220*a*, made up of parallel layers 220*a*-1, 220*a*-2, 220*a*-3 and 220*a*-4. While each individual layer has pixels or segments in a two dimensional matrix, one or more of the layers of token 220*a* may have fewer pixels or segments than the corresponding original layer in symbol 220. However, when graphic symbol 220*a* is overlaid layer-by-layer onto graphic symbol 220, there will be registration or matching of the desired number of pixels or segments. Instead of using the tokens made by taking portions of graphical symbol 220 to match the main graphic, graphical symbol 220 may be split into two or more portions, and the portions used as the tokens to determine if they complement each other, as described above. In such case a second partial token (not shown) would be created which contains in its layers the pixels or segments not contained in partial token 220*a*. The common edges would be determined layer-by-layer for corresponding layers of the three dimensional token images. As described further, unless otherwise noted, the term graphical symbol includes both two and three dimensional (including holographic) symbols.

Figure 7:
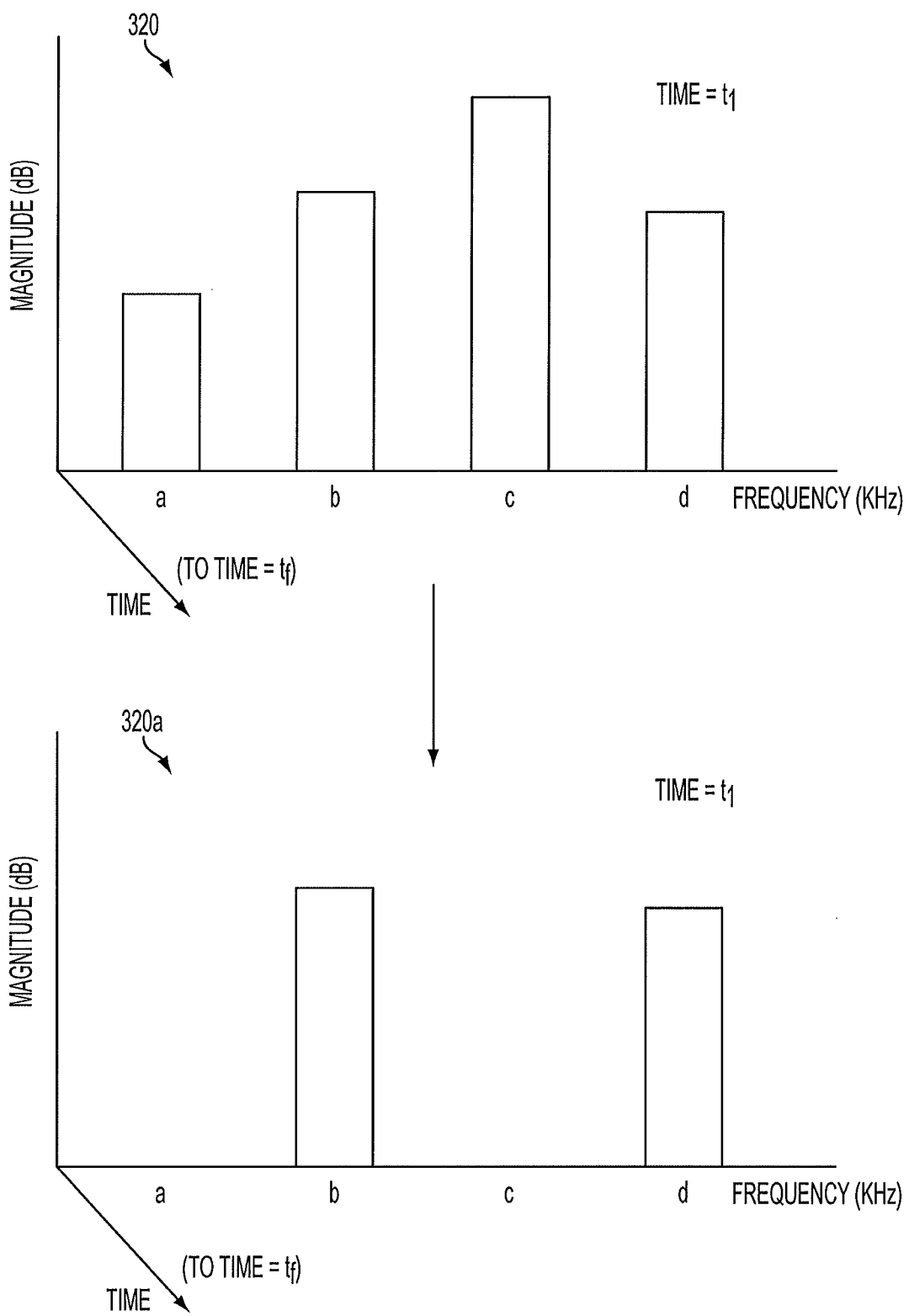
FIG. 7 is an example of a sonic symbol used for encryption showing a representation of the complete sound in a sonic symbol and a matching sonic symbol having only a portion of the sound representation of the complete symbol.

As an alternative to the two or three dimensional images, the token or key could be a sound or other sonic symbol. A few bars of Schubert's Trout Quintet or other well-known musical work, a person's voice, a whistle, the bark of the user's dog or other sound might be used. The complete sound selected to be used may be split sonically to create smaller portions by frequency, time or other method of partitioning. An example of a sonic key is shown in FIG. 7, where an initial sound 320 is shown at time t1, and is described by magnitude of the different frequency ranges, a, b, c, d, etc. At time t2 (not shown), there would be different magnitudes at the frequency ranges shown, and so on through subsequent time instants, until the complete time tf is completed. Sonic symbol is broken down in the example of FIG. 7 by frequency magnitude segments, in which partial sonic symbol or token 320*a* includes only the magnitudes for frequency ranges b and d. The partial sonic symbol can also have the full frequency magnitudes of sonic symbol 320, but for only a portion of the full time tf. Sonic token 320*a* would be compared to sonic symbol 320, to determine if the magnitudes match at the corresponding frequency ranges at the desired times. Alternatively, a second partial sonic symbol may be created, which includes only the magnitudes for the frequencies or time periods not in token 320*a*. The second partial sonic token would then be compared to token 320*a* to determine if they complement each other, i.e., combine to create the complete sonic symbol 320. The sound symbol or sequence may also be broken down by the tone's position on the scale, harmonic equivalents, or alternate tones, as well as other segments. These sonic tones or symbols may be split into two or more tokens that are used in the same manner of the graphical symbols described above, and a match or complement verified to permit device operation or verify a financial transaction.

In whatever form created, the tokens are physically stored separately. In an embodiment described herein, one token comprises the entire graphical symbol and the other token comprises only a portion of the same graphical symbol, for example, one-half of the entire graphical symbol. The entire graphical symbol may be referred to as the control token, or public key.

Once the picture/sound is taken or the graphical or sonic symbol is otherwise created, the image or sound is transferred to the memory accessible by the microprocessor or computer. Or if the picture or sound was taken by some other device, such as a cell phone, capable of making transactions, the image or sound is stored in the original device. Two, three or more points of registration of pixels or segments, or registration between sonic portions, may be employed to determine a match between the partial and the whole picture.

For instance, one half of the entire graphical or sonic symbol could be stored in a computer, tablet, telephone, or similar electronic device, or on a thumb drive and used to start and unlock a computer. The present invention can be used to disable stolen or lost cell phones. In this case one of the tokens may be stored in the device itself or its SIM, the other in a controlling pod that can communicate wirelessly with the phone or other device. Only when the two are within a predetermined proximity and thus in communication with each other can it be determined whether the tokens match or complement each other, and cause the device to function. If the two tokens become separated by more than the predetermined distance, wireless communication will cease, and the phone or other electronic device, will automatically be disabled because the token match or complement cannot be determined. If the cell phone and the controlling pod are brought within the satisfactory range once more the cell phone or other device will be automatically reactivated.

Figure 8:
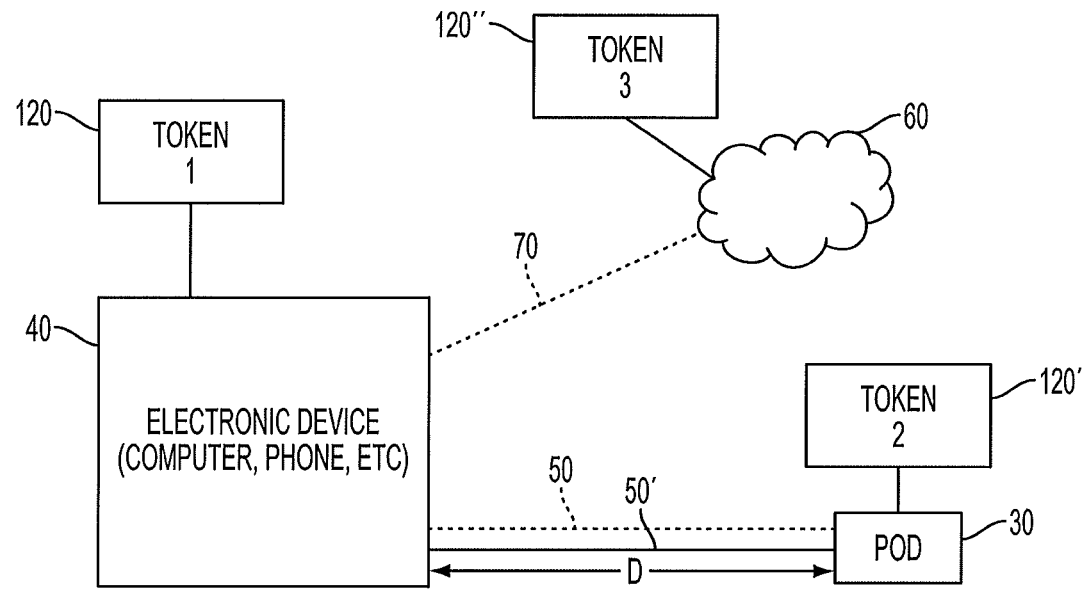
FIG. 8 is a schematic showing an example of the use of tokens encrypted using the method and system of the present invention to maintain and control operation of an electronic device.

As an example shown in FIG. 8, an electronic device 40 such as a computer, cell phone or the like contains one token 120 in its memory. The second, or control token or public key 120' is outside of the phone handset in a memory of a separate pod 30. They two keys 120, 120' are physically separated in separate memories, but may be in wireless communication 50 or wired communication 50'. In the example of using wireless communication, pod 30 containing the control token 120' could be a key fob, a credit type card in a wallet, or even a signet ring worn by the cell phones owner. It could also be used in the plastic credit card keys of the type used in hotels. Pod 30 may include a wireless transmitter, using for example RF- or infrared-transmitted signals, that permits the graphical symbol of token 120' to be transmitted to device 40 for comparison with token 120 in the device memory. Token 120 carried in the device 40 memory may be the entire graphical or sonic symbol and token 120' in the pod 30 may be a portion of the entire graphical or sonic symbol 120, or vice-versa.

In order to determine a match between tokens 120 and 120', a microprocessor in the device runs a comparing program that overlays the two graphical or sonic symbols and compares the pixels or segments of the two. To confirm the match, a predetermined minimum number of pixels or segment registration points must be identical and in identical positions when the picture, graphic or sonic portions of token 120' are overlaid onto the picture, graphic or sonic representation in token 120. The determination of matching of the pod's token 120' with the device's token 120 is done periodically or continuously while the devices are within wireless communication range "D." If the tokens match, the device continues to operate. In the event that the tokens do not match, the device will not function, or some device functions will be reduced or disabled to limit operability.

As long as the two physically separated but matching tokens 120, 120' are within wireless range or that of some other wireless broadcast technology enabling connectivity, the cell phone or other device 40 will function normally. It may even be possible to use the cell phone service provider's signal, or a sideband, to carry the pod's token information, though this would not be as secure as having a separate wireless contact between the physical devices containing the two tokens. In the case of, for example, cell phone theft, once the devices containing the two matching tokens 120, 120' are separated by the specified distance beyond distance "D," the cell phone will automatically be disabled or its functions will be reduced since the periodic matching determination does not continue. It is also useful in the case of communications equipment such as a cell phone that the owner's account with the service provider be automatically disabled when the phone is disabled. This not only prevents the stolen or lost phone from being utilized, it also prevents a thief from determining how to access the stolen phone's account through a different handset.

As further shown in FIG. 8, another use of this multi-token approach to information and device security would be to split the tokens between an electronic device 40 such as a computer, and the information stored in the cloud 60 or elsewhere. The graphical symbol or sonic representation of token 120 in the device and the graphical symbol or sonic representation of token 120" stored in the cloud' may be exchanged by Internet connection 70 to either maintain operation of device 40 or access to other information stored in cloud 60, as long as the tokens 120, 120" match. The comparison of the two tokens may be performed by a program in device 40, or by a program running in cloud 60. Employing such a graphical symbol or sonic representation approach offers not only a unique key, but one that could be easily updated or changed by the user, even on a daily basis.

Figure 9:
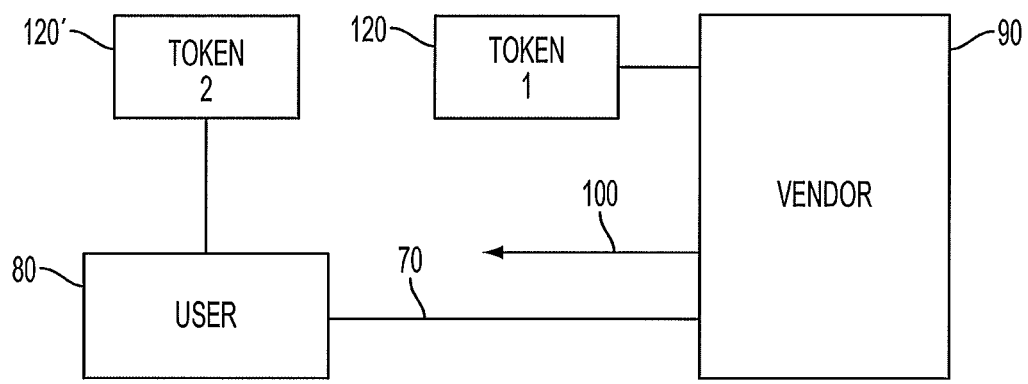
FIG. 9 is a schematic showing an example of the use of tokens encrypted using the method and system of the present invention to verify a transaction with a vendor over the Internet.

The graphical symbol tokens of the resent invention may be used to verify transactions, such as financial transactions or information access. An example of purchase verification is shown in FIG. 9, where a user's computer 80 attempts to place an order with a vendor 90 over an Internet connection 70. When ordering from a vendor such as Amazon, the whole or entire picture or other graphical or sonic symbol is sent by the user 80 as token 120 to Amazon. The ordering computer 80 or other device then immediately "rips" or partitions the picture, graphical symbol or sonic representation of token 120 into two or more pieces, such as portions 20a, 20b, 20c, 20d of FIG. 2, and saves at least one as token 120'. Token 120' is subsequently sent as the key or password from the ordering device 80 to Amazon 90. In the case of a graphical symbol, a credit card number and information, or other identifier can be embedded in the partial picture, either visually as numbers (e.g., as in FIG. 5), or coded. Once the partial picture, graphical or sonic token 120' is overlaid onto the whole picture, graphical or sonic token 120 at the vendor's computer and matched using the pixels or segments as register points, the order 100 is processed and released to the user 80. As soon as the order is processed, the partial picture, graphical or sonic token 120' is erased. All that remains at Amazon is the whole original picture, graphical or sonic as token 120. A hacker breaching Amazon's computer will then get a photo album of random pictures, or a recording of sounds, but no real information.

The same picture graphical or sonic token 120 can be used over and over again, with the ordering computer "ripping" the image or sound in a different fashion into tokens with portions different than initial token 120'. As long as the pixel or segment registration points remain positioned in the same place, and the tokens with partial pictures, graphics or sounds match the whole picture, graphic or sound at Amazon, the transaction will be accepted. A new picture or sound can easily be taken by the user and employed for each separate ordering operation.

The same secure procedure of FIG. 9 may be used in reverse. Alternatively, what is shown as vendor 90 may be the cloud, and the order 100 released is the transfer of information in electronic fashion to the user upon matching of tokens 120 an 120'.

The tokens may be used for the chip-and-PIN system used in credit card verification and similar systems. The image, graphic or sound could be used either as a substitute for the PIN number, or imbedded in the chip. In the latter case, cell phones or cameras could be designed with a port for credit card insertion so that the image, graphic or sound on the chip could be changed by the user. A similar arrangement for the PIN could also be devised, allowing the user to change the "PIN".

As an alternative to employing complete and partial graphical or sonic symbols and determining whether there is a match therebetween, i.e., registration of a minimum number of pixels or segments, adjacent portions of a larger graphical or sonic symbol such as portions 20a, 20b, 20c, 20d of FIG. 2 may be used in the pod/device system of FIG. 8 or the user/vendor system of FIG. 9. In this alternative, the two or more graphical or sonic symbol portions 120, 120' are compared to determine if one portion complements the other portion to maintain the device operation (FIG. 8) or complete the financial transaction (FIG. 9).

The present invention may be embodied as a system, method or computer program product. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, radio frequency (RF) or the like, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to diagrams of function blocks or modules in drawing FIGS. 8 and 9 showing methods, apparatus (systems) and computer program products according to embodiments of the invention. It will be understood that each block and combinations of blocks in the drawings can be implemented by computer program instructions, preferably written in Microsoft.NET available from Microsoft Corporation, Redmond, Wash. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the function blocks or modules in drawing FIGS. 8 and 9.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the function blocks or modules in drawing FIGS. 8 and 9.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the function blocks or modules in drawing FIGS. 8 and 9.

The function blocks or modules in drawing FIGS. 8 and 9 illustrate the architecture, functionality, and operation of possible implementations of systems, methods and computer program products according to various embodiments of the present invention. In this regard, each block in the drawing may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in the drawing can be implemented by special purpose hardware-based systems that perform the specified functions or acts, or combinations of special purpose hardware and computer instructions. Also, although communication between function blocks or modules may be indicated in one direction on the drawing, such communication may also be in both directions.

Thus, the present invention provides an improved encryption method and system that is not dependent on the use of alphanumeric characters, and in which the customer or other user may customize and readily change the password, token or key used for the encryption. The method and system of the present invention employ visual, graphical, holographical or sonic representation in place of the traditional alphanumeric keys used in encryption. The method and system are useful for maintaining and controlling operation of an electronic device, and verifying financial and information transactions with a vendor over the Internet.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of initiating the operation of a component controlled by an electronic device, the method comprising:
    providing an electronic device for operating a component and a separate controller for the electronic device, the controller in communication with the electronic device;
    providing a computer in communication with the electronic device and the controller, the computer having a processor and a memory comprising program instructions that, when executed by the processor, cause the computer to create, from a control token based on a picture having at least a two-dimensional array of continuous pixels arranged in a visually distinct pattern, a second token comprising a discontinuous array of pixels from the control token, the second token comprising fewer pixels than the control token;
    providing to the computer, by a user of the electronic device, a control token based on a picture having at least a two-dimensional array of continuous pixels arranged in a visually distinct pattern, the control token being accessible by the electronic device;
    creating, by the computer and without input from the user, from the control token, a second token comprising a discontinuous array of pixels from the control token, the second token comprising fewer pixels than the control token and being accessible by the controller for the electronic device;
    transmitting, by the controller, the second token to the electronic device;
    comparing, by the electronic device, the second token to the control token by overlaying the discontinuous array of pixels of the second token onto the two-dimensional array of continuous pixels of the control token;
    periodically determining, by the electronic device, that the position of all pixels in the discontinuous array of pixels of the second token match and are identical to the position of the underlying continuous pixels of the control token;
    responsive to the determination that the position of all of the fewer pixels of the second token are identical to the position of the underlying greater pixels of the control token, initiating, by the electronic device, the operation of a component of the electronic device by transmitting a signal to the component of the electronic device; and
    responsive to a determination that the position of all of the fewer pixels of the second token are not identical to the position of the underlying greater pixels of the control token, deactivating, by the electronic device, a component of the electronic device by transmitting a signal to the component of the electronic device.

2. The method of claim 1 further including physically connecting the controller to the electronic device and transmitting the second token from the controller to the electronic device before comparing the second token to the control token.

3. The method of claim 2 further including deactivating at least a portion of the electronic device responsive to the controller no longer being physically connected to the electronic device.

4. The method of claim 1 further including physically locating the controller near the electronic device and transmitting the second token from the controller to the electronic device by wireless radio frequency transmission before comparing the second token to the control token.

5. The method of claim 4 further including deactivating at least a portion of the electronic device responsive to the controller no longer being physically within a predetermined distance of the electronic device.

6. The method of claim 1 wherein the controller is carried by an authorized user of the electronic device.

7. The method of claim 1 wherein the controller transmits the second token to the electronic device via the Internet.

* * * * *